(12) United States Patent
Voigt et al.

(10) Patent No.: US 6,666,254 B2
(45) Date of Patent: Dec. 23, 2003

(54) METHOD FOR THE UPHILL CASTING OF CAST PIECES IN SAND MOULDS WITH CONTROLLED SOLIDIFICATION

(75) Inventors: Heiko Voigt, Pegau (DE); Norbert Demarczyk, Grumbach (DE)

(73) Assignee: ACTech GmbH Advanced Casting Technologies Giessereitechnologie, Freiberg (DE)

( * ) Notice: Subject to any disclaimer, the term of this patent is extended or adjusted under 35 U.S.C. 154(b) by 0 days.

(21) Appl. No.: 10/240,220
(22) PCT Filed: Mar. 9, 2001
(86) PCT No.: PCT/DE01/00941
§ 371 (c)(1), (2), (4) Date: Sep. 26, 2002
(87) PCT Pub. No.: WO01/72452
PCT Pub. Date: Oct. 4, 2001

(65) Prior Publication Data
US 2003/0102100 A1 Jun. 5, 2003

(30) Foreign Application Priority Data
Mar. 27, 2000 (DE) .......................................... 100 14 591

(51) Int. Cl.⁷ ............................................... B22D 27/15
(52) U.S. Cl. ............................ 164/65; 164/7.1; 164/119
(58) Field of Search ........................... 164/65, 257, 7.1, 164/359, 362, 363, 119, 306

(56) References Cited

U.S. PATENT DOCUMENTS 5,113,926 A * 5/1992 Kanzawa et al. ........... 164/119

* cited by examiner

Primary Examiner—Tom Dunn
Assistant Examiner—I.-H. Lin
(74) Attorney, Agent, or Firm—George W. Neuner; Edwards & Angell, LLP

(57) ABSTRACT

A method is described for uphill casting in sand molds with high-resin casting cores or especially casting cores containing binders, and with directed solidification of metallic castings that have at least one cavity. In particular, these are prototypes of engine blocks or cylinder heads, for example for internal combustion engines that are provided with a cavity through which coolant water flows. To provide for low-turbulence flow of the liquid molten metal during the deaeration of the casting mold, the casting mold is provided with at least one feeder head that is connected through a casting system to an infeed funnel, and the molten metal it contains is displaced by gravity through the casting system into the casting mold, with the cavity in the molten metal being subjected after the filling to reduced pressure that is greater than the pressure of the core gases formed in the core. This eliminates the hindrance to filling the mold from air pockets in the mold. At the same time, dense and pore-free, mechanically strong cast parts are produced by the method.

8 Claims, 1 Drawing Sheet

METHOD FOR THE UPHILL CASTING OF CAST PIECES IN SAND MOULDS WITH CONTROLLED SOLIDIFICATION

CROSS-REFERENCE TO RELATED APPLICATION

This application is a 371 of PCT/DE01/00941 filed on Mar. 9, 2001.

FIELD OF THE INVENTION

This invention relates to a method for uphill casting in sand molds with high-resin casting cores, or in particular casting cores containing binders, and with directed solidification of metal castings with at least one cavity, particularly, casting of prototypes of engine blocks or cylinder heads, for example, for internal combustion engines that are provided with a cavity for the passage of coolant water.

BACKGROUND OF THE INVENTION

Corresponding castings in the form of engine blocks or cylinder heads with channels for coolant fluid are made today in large numbers of light metal or aluminum or magnesium alloys. Such castings pursuant to the state of the art are made by casting liquid metal in chill molds, which produces good dimensionally stable surfaces. A general problem for casting production results from the necessary coolant water channels, which can be produced practically only by using casting cores. These casting cores are so-called lost cores, which have to be removed after the cooling of the block. They are usually made of mold compounds, for example of mold sand using binders. Another method for producing such blocks consists of making patterns out of polystyrene foam. During the casting of the liquid metal, the polystyrene foam melts and burns up. In both cases the gases formed have to be removed by suction. Furthermore, gas bubbles may form during the casting, which lead to gas defects and leaks in the finished casting.

According to DE 36 18 059 A1, the gases formed in the chill mold during uphill casting are drawn off through two ventilation ports during the filling, which are placed at the highest point of the casting mold. In this case the ventilation ports have to be so tight that the liquid metal cannot pass through. For the tight infeed of the casting, the casting pressure as a rule has to be maintained up to a given degree of solidification so that the shrinkage of the casting occurs in the area of the riser tube in the poured section of the mold.

This method cannot be carried over to the production of prototypes by means of sand molds. In the preparation of prototypes, high-resin laser-sintered casting cores that have high binder content are being used more and more frequently. These likewise cause gases during the casting that can bring about foam, pores, and bubbles on the surface of the casting. Because of later mass production in the automobile industry, high-performance prototypes also have to be made available, which guarantee a high quality standard, especially for high-load components.

For this reason, the present invention has an objective of developing a casting method, especially for prototypes, that provides castings with assembly line characteristics.

It is well known that casting cores are given ventilation holes at the core marks in order to carry off the casting gases from the casting core during casting. According to DE 24 26 717 A1, it is known that the air in the mold cavity is carried off by suction during the casting, and a partial vacuum is produced in the mold cavity. The air in the mold cavity can thus cause no counterpressure with the gases that are formed, so that the actual casting pressure is reduced, at least in the area of the outer wall of the later cast part. This can avoid gas defects, because the air can escape quickly and at the right time. The elevation of casting pressure depends on a corresponding increase of the specific pressure of the surrounding atmosphere acting through the mouth of the mold or the head of the casting. To produce a casting, a mold is used in which the perforated wall of the mold cavity is connected to the vacuum source through a pipe. The rate of filling with molten metal can thereby be increased. The same conditions thus exist in the method described in DE 22 58 461 A1 and DE 32 40 808, in which the casting molds are provided with air-permeable walls and are connected to a vacuum source.

However, increasing the rate of filling may cause turbulence in the molten metal, by which parts of the sand mold and slag are loosened and enclosed. To prevent this as much as possible, uphill casting has proved useful for mold casting, since the molten metal in this case is not made turbulent, but the mold is filled with a calm front of melt. Oxide inclusions in the casting can thereby largely be avoided.

The task of the invention thus consists of a method for uphill casting in which a low-turbulence flow of liquid molten metal is provided for while removing air from the casting mold. Hindrance to filling from pockets of air in the mold is also to be eliminated. At the same time, dense and pore-free mechanically strong castings are to be produced by the method.

SUMMARY OF THE INVENTION

This invention provides a method for uphill casting in sand molds with high-resin casting cores or especially casting cores containing binders, and with directed solidification of metallic castings that have at least one cavity. In particular, the method provides prototypes of engine blocks or cylinder heads, for example for internal combustion engines that are provided with a cavity through which coolant water flows.

To provide for low-turbulence flow of the liquid molten metal during the deaeration of the casting mold, the casting mold (1) comprises at least one feeder head (24) that is connected through a casting system (22) to an infeed funnel (23), and the molten metal is displaced by gravity through the casting system (22) into the casting mold (1), with the cavity (11') in the molten metal being subjected after the filling to reduced pressure that is greater than the pressure of the core gases formed in the core.

This eliminates the hindrance to filling the mold from air pockets in the mold. At the same time, dense and pore-free, mechanically strong cast parts are produced by the method.

According to the invention, a method for uphill casting in sand molds is provided in which the cavity formed by the high-resin or binder-containing casting core is subjected after loading the molten metal to reduced pressure, which eliminates the pressure of the core gases relative to the molten metal, with the entry of core gas into the molten metal being prevented.

Pursuant to a preferred refinement of the invention, the reduced pressure in the cavity is generated by a vacuum device connected to at least one core mark. While the molten metal in known gravity casting flows into the casting mold under the influence of gravity and solidifies under normal atmospheric pressure, in the proposed method the molten metal solidifies under reduced pressure that is generated in the core.

According to another refinement of the invention, the removal of air from the casting mold is accomplished through the vacuum device connected to the core marks. Removing air from the casting mold through the core marks has the advantage that no reduced pressure can be created in the casting mold during casting that increases the rate of filling by molten metal. This can be attributed to the fact that the reduced pressure in the cavity can be created only when the casting core is completely enveloped by liquid molten metal and is enclosed air-tight by it. Thus air can be removed from the casting mold during the casting.

According to a further development of the invention, dense infeed can be improved if the casting mold is cooled during the venting of air. Cooling causes directed solidification of the molten metal, which will be explained in detail below with reference to an example of embodiment and with reference to drawings.

BRIEF DESCRIPTION OF THE DRAWINGS

The drawings of an example of one embodiment of the invention show.

DETAILED DESCRIPTION OF THE INVENTION AND PREFERRED EMBODIMENTS

Figure 1:
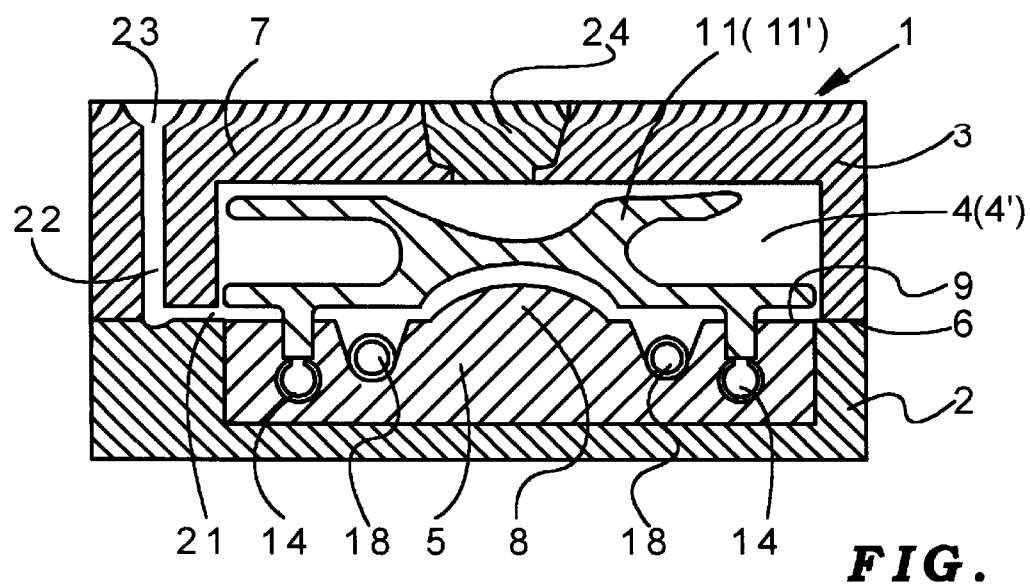
FIG. 1 cross section through a casting mold with a base core.

The casting mold 1 according to FIG. 1 for implementing the method pursuant to the invention has a horizontal parting line 6 between a bottom box mold 2 and a top box mold 3 made of mold material 7, which forms a mold cavity 4 for a casting, especially for a cylinder head 4', that is to be filled with the liquid molten metal to be cast. Mold sand with a resin-containing binder is preferably used as mold material 7 in the example of embodiment. However, the invention is not limited to the illustration of the casting mold 1 made of mold sand. The bottom box mold 2 has a base core 5, for example with a bulged subsection 8 that undertakes the modeling of the cylinder head 4' on the combustion chamber side. It is preferred to use for the base core 5 a mold material that can be machined by milling. The parting plane 6 between the two halves of the mold runs horizontally in the plane of the seal face 9 of the future cylinder head 4'. The bottom box mold 2 including the base core 5 can also be made as one part by conventional mold methods.

The mold cavity 4 for the cylinder head 4' also has a core with appropriate core marks 12, which is called the water-jacket core 11 below in the example of embodiment. The core marks 12 are anchored in the base core 5. The water-jacket core 11 forming a cavity 11' is assembled as one piece or consisting of several core packets into a water-jacket core 11. The water-jacket core 11 is produced in the production of prototypes with a high-resin mold material by selective laser sintering. Water-jacket cores 11 made by laser sintering ordinarily have a binder fraction that is multiple times higher, so that elevated evolution of casting gases is found during the casting.

Figure 2:
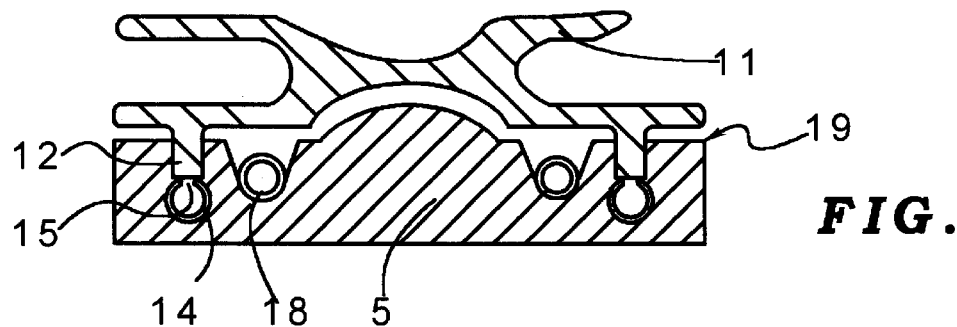
FIG. 2 the base core of FIG. 1 with a water-jacket core.

There are ventilation tubes 14 imbedded in the base core 5 below the core marks 12 that are provided with a ventilation hole 15 in the area of the core marks 12 according to FIG. 2, so that the core marks 12 are connected on their faces with the ventilation holes 15. A system of ventilation holes can be continued in the core or set into the core itself. Alternatively, the cores can also be anchored in the top box mold 3 or in other mold elements.

Figure 3:
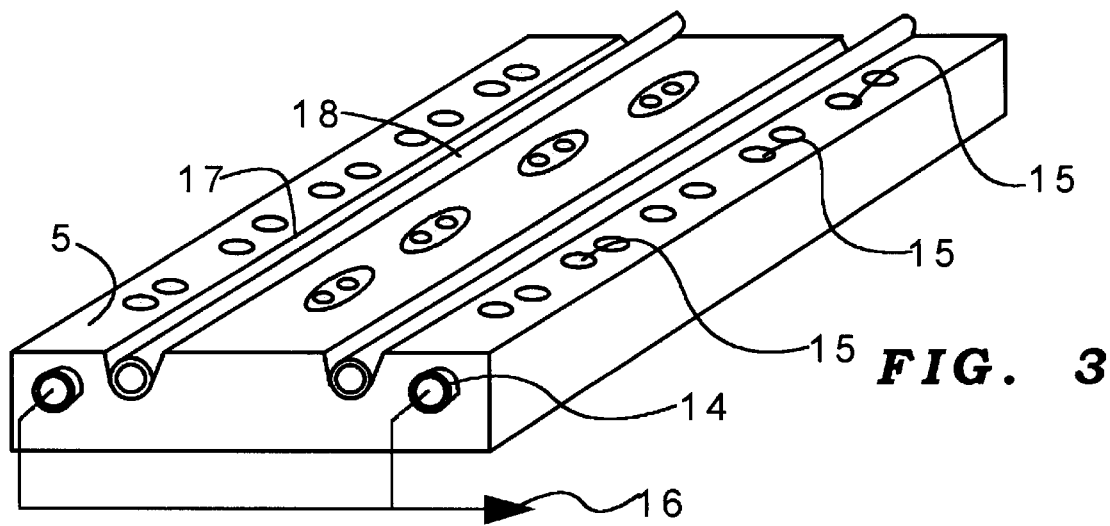
FIG. 3 a perspective illustration of a base core in schematic representation.

As shown in FIG. 3, the ventilation tubes 14 can be provided with multiple ventilation holes 15 so that each core mark 12 is deaerated. The ventilation tubes 14 are connected outside of the casting mold 1 to a vacuum device 16, not shown.

As also shown in FIG. 3, cooling channels 17 are provided in the plate-like base core 5 that are used to hold a cooling system, for example in the form of cooling tubes 18. The cooling channels 17 are open on the casting chamber side so that the inflowing molten metal is cast directly on the cooling tubes 18 on the cylinder head 4'. The cooling system with cooling tubes 18 can be provided with a black wash prior to casting to prevent bonding to the casting metal. The adhering cooling system under some circumstances can even be removed manually after solidification. Between the cooling system 18 and the later seal surface 9 of the cylinder head 4' there is a machining oversize 19 so that the cooling system 18 and its imprint can easily be removed by cutting tools after casting.

The casting mold 1 according to FIG. 1 is filled in the example of embodiment from the side through a horizontal slot 21 that is provided with an infeed funnel 23 through a casting system 22. The infeed funnel 23 is at the same height as a feeder head 24 located above the casting mold 1 that is intended for dense feed. In this way, the casting mold 1 is filled at the lowest point as with a chill mold with a riser pipe. An undesirable temperature distribution is created since the infeed funnel 23 does not form the feeder head 24 with the last molten metal fed in. The temperature distribution is inverted by using the cooling system at the bottom of the cylinder head 4'. The principle of directed solidification is thereby realized, since the temperature rises toward the feeder head 24. This can be assisted by interrupting the filling of the mold when the bottom level of the feeder head 24 is reached and casting the rest of the hot metal directly into the feeder head 24.

This invention presupposes that a particularly stress-resistant structure is developed by directed solidification, that in the case of a cylinder head 4' is located on the combustion chamber side with the overlying water jacket. This area is most highly stressed in operation by the prevailing temperature gradient. During the casting, the metal cast last, which is the hottest at this point, is in this area. Consequently the development of bubbles is prevented by the targeted cooling. Bubbles result from the contraction that originates during the casting of the molten metal and during the subsequent solidification of the metal. The invention also proceeds from the consideration of removing the gases formed during the casting at the core marks 12 by suction, and producing reduced pressure in the cavity 11' after casting. The reduced pressure here is achieved automatically when the casting mold 1 is completely fined with molten metal.

As long as the casting mold 1 is not completely filled or the cavity 11' is not enclosed by molten metal, only an insignificant pressure increase can occur without increasing the rate of filling of the casting mold 1. In uphill casting, the casting mold 1 is therefore filled with a calm molten front. After the filling process is complete, resistance at the ventilation tubes 14 is increased and reduced pressure that is greater than the metallostatic pressure in the molten metal can be created in the cavity 11'.

In this way, dense infeed of the area of the cylinder head 4' on the combustion chamber side is provided for by the reduced pressure in combination with the directed solidification by cooling. The area that solidifies quickly is after-fed by the rest of the molten metal from the feeder head 24. Prototypes of production line quality can be made in this economical way by sand casting. The invention has the effect that castings of outstanding casting quality are formed. Largely pore-free and mechanically very strong castings are produced. Besides an especially high-grade casting grain structure, the development of bubbles is effectively avoided.

What is claimed is:

1. A method for uphill casting in sand molds having a high-resin casting core or a casting core containing a resin binder, the method including directed solidification of castings, the method comprising:

providing a casting mold comprising a mold cavity and at least one feeder head, which is connected through a casting system to an infeed funnel;

displacing molten metal contained in the feeder head by gravity through the casting system into the casting mold; and after filling the mold, subjecting the cavity provided by the casting core to reduced pressure in the molten metal that is greater than the pressure of the core gases formed in the core.

2. The method pursuant to claim 1, wherein the method produces an engine block or a cylinder head for an internal combustion engine.

3. The method pursuant to claim 1, wherein the mold comprises a cavity for flow of coolant water.

4. The method pursuant to claim 1, further comprising:

providing a vacuum device; and generating the reduced pressure in the mold cavity with the vacuum device by connecting the vacuum device through ventilation tubes to ventilation holes on at least one core mark.

5. The method pursuant to claim 1, further comprising:

providing in the mold a ventilation system extending into the core, providing a vacuum device; and generating the reduced pressure in the mold cavity through the ventilation system.

6. The method pursuant to claim 1, further comprising ventilating the casting mold during filling of the mold with metal in the displacing step.

7. The method pursuant to claim 6, wherein the ventilating is performed through a vacuum device connected to core marks.

8. The method pursuant to claim 1, further comprising cooling the casting mold after and/or during the filling of the casting mold in the displacing step.

* * * * *